Nov. 2, 1965    W. PECHMANN    3,214,886
BOTTLE CAPPING MACHINE

Filed Sept. 12, 1962    3 Sheets-Sheet 1

INVENTOR
Wilhelm Pechmann
BY
Michael S. Striker

United States Patent Office 3,214,886
Patented Nov. 2, 1965

3,214,886
BOTTLE CAPPING MACHINE
Wilhelm Pechmann, Burscheid, near Cologne, Germany, assignor to H. Strunck & Co. Maschinenfabrik, Cologne-Ehrenfeld, Germany
Filed Sept. 12, 1962, Ser. No. 223,121
Claims priority, application Germany, Sept. 14, 1961, St 18,325
15 Claims. (Cl. 53—304)

The present invention relates to machines for applying caps to bottles and similar containers, and more particularly to a capping machine which constitutes an improvement over and a further development of the machine disclosed in my copending application Serial No. 111,776, now Patent No. 3,156,426.

In my copending application, I disclose a capping machine which comprises one or more rotary cap holders, hereinafter called capping members or capping heads, each of which accommodates an elastically deformable chuck serving as a means for engaging and for rotating a cap during application of the cap to the top of a bottle or a similar container. As a rule, the caps are provided with internal threads which mate with external threads on the open tops of containers. I have found that, since the capping members and the chucks rotate without interruption, it is often difficult to properly insert a cap into the chuck, especially if the caps are not machined with utmost precision. Consequently, an oversized cap may become stuck on its way toward or in the interior of the chuck, an undersized cap may drop through the capping member before it can be applied to a container, or the cap is not properly aligned with a container so that its threads cannot mate with the threads on the open top of the container. Furthermore, since the caps are introduced into the chuck by application of at least some force, the wear on the chuck is often considerable which may result in undesirable interruptions of the capping operation wherever it becomes necessary to replace a chuck.

Accordingly, it is an important object of my invention to provide a capping machine which is constructed and assembled in such a way that each cap is properly centered in the respective chuck just before the chuck engages and begins to rotate the cap preparatory to application of the cap to the open top of a bottle or a similar container.

Another object of the invention is to provide a greatly simplified capping machine wherein each cap may descend by gravity feed all the way to a position in which it is properly centered within and may be engaged by the respective chuck.

A further object of the invention is to provide a capping machine whose chuck or chucks are subjected to less wear and tear than similar chucks in conventional capping machines of which I have knowledge at this time.

An additional object of the invention is to provide a very simple and highly reliable retaining member which is capable of automatically centering each cap before the cap is engaged by and begins to rotate with the chuck.

A concomitant object of my invention is to provide a capping machine which may be readily converted for mass-application of caps or for application of caps on a smaller scale and wherein the delivery, entry, engagement and application of consecutive caps take place in a fully automatic way so that neither the caps nor the containers must be touched by hand from the very start and to the completion of the capping operation.

Still another object of the instant invention is to provide a capping machine which may be rapidly converted for capping of different types of containers or for application of differently dimensioned and/or configurated caps.

Another object of my invention is to provide a method of centering caps in a capping machine of the above outlined characteristics.

With the above objects in view, the invention resides in the provision of a machine for applying caps to bottles and similar containers, preferably for applying internally threaded caps to externally threaded tops of bottles. The machine comprises at least one substantially vertical tubular capping member, an elastically deformable tubular chuck received in and secured to the capping member and having a vertical bore adapted to slidably accommodate a cap in undeformed or non-gripping condition of the chuck, means for reciprocating the capping member and the chuck between a raised position in which the chuck may receive a cap and a lower position in which the chuck may apply the cap to a container, means for deforming the chuck into frictional gripping engagement with the cap so that a cap received in the bore of the chuck may be connected to and is then reciprocable with the capping member, a retainer member having an upper side located at a level below the lower end of the chuck in raised position of the capping member, and means for moving the retaining member with respect to the capping member or vice versa so that the two members may assume positions of vertical alignment with each other whereby a cap introduced into the bore of the undeformed chuck may come to rest on the upper side of the retainer member and is properly centered with respect to the chuck when the retainer member is aligned with the capping member. On the other hand, when the retainer member is not aligned with the capping member and the chuck is deformed to frictionally engage the cap, the latter may descend with the capping member and may be applied to a container.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
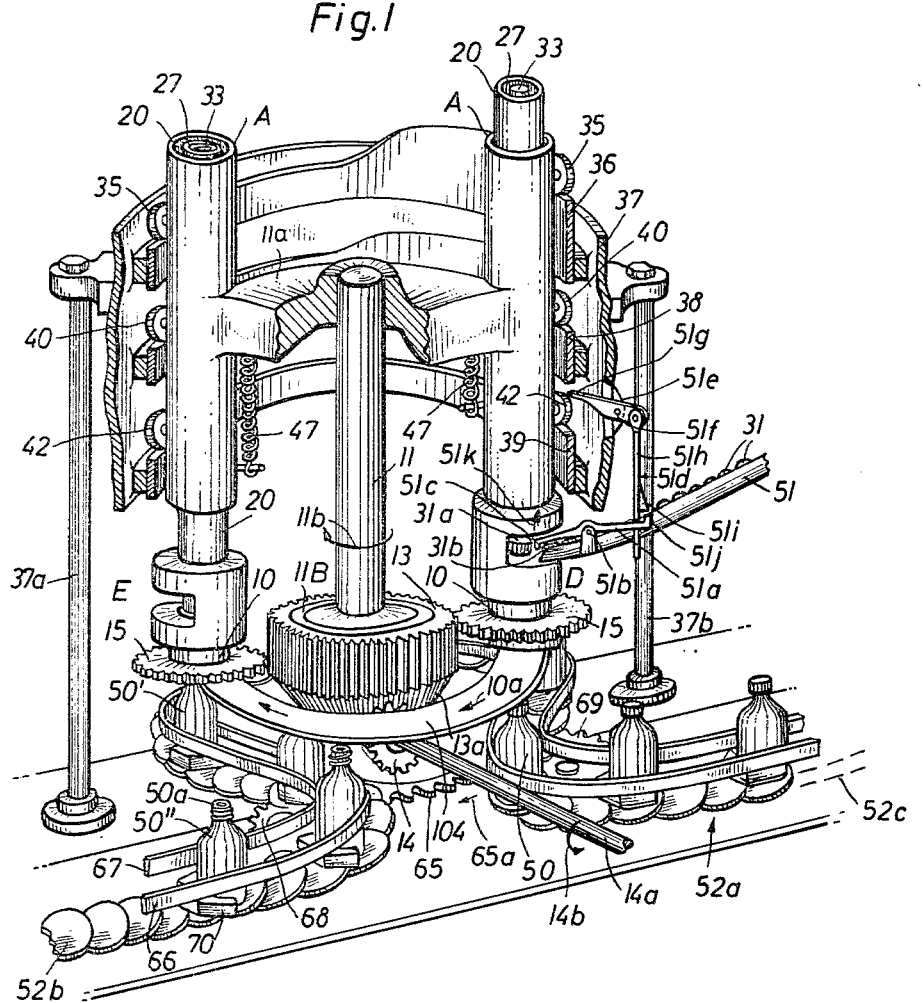
FIG. 1 is a perspective view of a bottle capping machine which comprises two orbiting capping members and a stationary retainer member.
Figure 2:
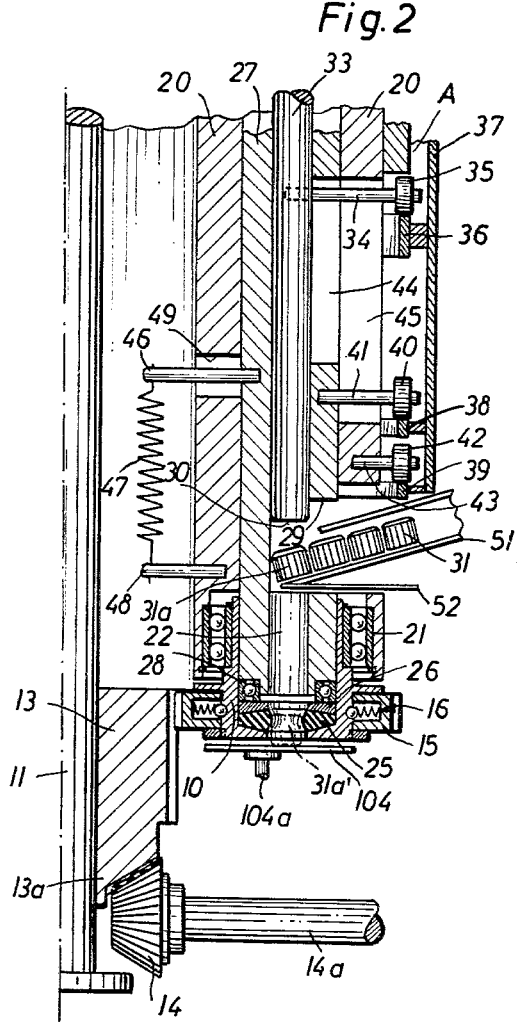
FIG. 2 is an enlarged axial section through one capping member and through certain other parts of the capping machine.

Referring now in greater detail to the illustrated embodiments, and first to FIGS. 1 and 2, there is shown a bottle capping machine which comprises two orbiting tubular capping members or heads 10. Each capping member is rotatably mounted on antifriction bearings 21 provided at the lower end of a hollow vertical supporting sleeve 20, and the sleeves 20 are vertically reciprocably received in tubular guides A secured to or forming part of a crosshead 11a, which is mounted on and which is rotated by a vertical shaft 11 whose lower end is rotatable in a floor-mounted bearing, not shown. In FIG. 1, the right-hand sleeve 20 is shown in raised position in which it maintains its capping member 10 above the tops of bottles 50 advancing between a pair of curved rails 66, 67 by means of a specially constructed conveyor 52a including a row of articulately connected plates 52b, a chain 52c which is fixed to the undersides of the plates 52d, a pair of spaced deflecting sprockets 68, 69 which engage with the chain 52c, and a driver sprocket 65 which advances the chain 52c in an arcuate path extending between the guide rails 66, 67 and which drives the shaft 11.

The means for rotating the capping members 10 about their respective axes comprises a driver gear 13 which is mounted on and which rotates about a bearing 11B mounted on the shaft 11. The gear 13 is driven by a bevel gear 13a mating with a second bevel gear 14 provided at one end of a horizontal driver shaft 14a which is rotated by a suitable electric motor or the like, not shown. The driver gear 13 mates with driven gears or pinions 15 which coaxially surround and are connected to the respective capping members 10 by overload couplings 16 one of which is shown in FIG. 2. This coupling comprises spring-biased balls accommodated in radial recesses of the respective pinion 15 and normally projecting into shallow concave grooves in the periphery of the respective capping member 10 so as to rotate the capping member when the pinion 15 is driven, and to permit independent rotation of the pinion when the capping member offers excessive resistance to rotation.

The bore of each capping member accommodates an elastically deformable cap-receiving tubular chuck 25 which assumes the form of an annulus tightly fitted into and secured to the head 10 and having a vertical bore adapted to receive a cap 31 when the chuck is in undeformed condition. The means for axially compressing and for thereby deforming the chuck 25 comprises a vertical cylinder 27 which is slidably fitted into the respective sleeve 20, a bearing 28 at the lower end of the cylinder 27, and a hard ring 26 which is mounted between the upper side of the chuck and the bearing 28. The capping machine further comprises two vertical cap advancing or inserting plungers or rams 33 which are slidable in the bores 22 of the respective cylinders 27 and whose purpose is to advance the foremost cap 31a into the bore of the respective chuck 25 when the latter is in undeformed condition. The chucks 25 receive caps 31 when the respective capping members reach a transfer station D which is adjacent to the discharge end of a feeder means here shown as an inclined U-shaped magazine or chute 51 which delivers caps by gravity feed.

The sprocket wheel 65 rotates in a direction as indicated by arrow 65a to drive the shaft 11 in a clockwise direction (arrow 11b), and the sprocket wheel 65 also drives the sprocket wheels 68, 69 to advance the conveyor 52a between the arcuate rails 66, 67. The gear 13 which is driven by the shaft 14a (arrow 14b) constitutes a sun wheel and the pinions 15 constitute planet wheels, thus causing the capping members 10 to rotate or orbit about the vertical axis of the shaft 11 (arrow 10a) so that the capping members alternately pass along the transfer station D and thereupon along a capping or sealing station E at which the caps delivered by the chute 51 are applied to consecutive bottles 50 while the bottles advance with the conveyor 52a in an arcuate path which is overlapped by the circular path of the orbiting capping members. It will be noted that some of the plates 52b are provided with U-shaped motion transmitting lugs 70 which compel the bottles to advance with the conveyor and to move in the arcuate path between the guide rails 66, 67.

Each cylinder 27 is biased aaginst the respective bearing 28 by a helical spring 47 which is mounted between two pins 46, 48, the latter being secured to the respective sleeve 20 and the former being fixed to the respective cylinder 27 and extending through an elongated slot 49 of the sleeve 20. The pins 46, 48 pass outwardly through suitable cutouts provided in the respective guides A. Each sleeve 20 tends to move in its guide A downwardly by gravity so as to lower the respective capping member 10 toward the tops 50a of bottles 50. Axial movements of the sleeves 20 are controlled by an annular cam 39 which cooperates with two roller followers 42, the latter fixed to radial pins 43 carried by the sleeves 20 and extending through cutouts provided in the respective guides A. The cam 39 is rigid with a hollow tubular support 37 which is mounted on a pair of uprights or columns 37a, 37b. A second annular cam 38 of the tubular support 37 cooperates with two roller followers 40 to regulate axial movements of the cylinders 27 against the bias of the respective springs 47. The followers 40 are mounted on radial pins 41 secured to the respective cylinders and extending through elongated slots 45 provided in the respective sleeves 20 and through aligned slots provided in the guides A.

A third annular cam 36 is rigid with the support 37 and cooperates with two roller followers 35 mounted on pins 34 fixed to the respective plungers 33 to bring about upwardly directed axial movements of these plungers. The pins 34 extend through respective slots 45, through vertical slots 44 provided in the respective cylinders 27 and through slots provided in the respective guides A. The configuration of the cams 36, 38, 39 is selected in such a way that the plungers 33, the cylinders 27 and the sleeves 20 reciprocate in a predetermined sequence which is necessary to insure that a cap 31 is properly inserted into the chuck 25 of that capping member 10 which advances from the station E, and that the cap is thereupon applied to the top 50a of a bottle 50 while the chuck advances from the station E and back to the station D.

FIG. 2 shows that each sleeve 20 comprises a cutout 29 which receives the discharge end of the chute 51 when the respective sleeve advances along the station D, and that each cylinder 27 comprises a similar cutout 30 which is inwardly adjacent to the respective cutout 29.

Certain of the heretofore described elements of the capping machine are fully disclosed in my application Serial No. 111,776 and are shown here solely for better understanding of my present invention residing in the provision of a horizontal retainer member or support 104 which assumes the shape of a flat strip of arcuate shape having a first portion disposed beneath the lower end of a chuck 25 accommodated in that capping member 10 which is momentarily located at the station D, and a second portion which is adjacent to but does not extend below the station E. The upper side of the retainer member 104 is located at a level above the tops 50a of the bottles 50 but below the lower ends of the chucks 25 when the sleeves 20 are moved upwardly to lift the capping members to their raised positions while the capping members advance from the station D toward the station E. The purpose of the retainer member 104 is to cooperate with the capping members and to insure that the caps admitted into the bores of the chucks 25 are properly engaged by and are properly centered in the chucks prior to their application to the tops 50a. Thus, a cap 31a′ (see FIG. 2) which has entered the bore of the respective chuck 25 is free to descend onto and is supported by the upper side of the fixed retainer member 104 while the cylinder 27 moves downwardly under the bias of its spring 47 to compress the chuck 25 axially and to simultaneously deform the chuck radially inwardly so as to insure that the cap 31a′ is frictionally engaged by and shares rotational movements of the chuck at the time the respective capping member reaches the station E.

The capping machine of FIGS. 1 and 2 operates as follows:

The motor which drives the shaft 14a is started to rotate the driver gear 13 so that the capping members 10 begin the orbit about the axis of the shaft 11, and the sprocket wheel 65 rotates the shaft 11 so that the conveyor 52a entrains the bottles in the arcuate path between the rails 66, 67 and that the followers 35, 40, 42 begin to travel along the respective cams. That capping member which reaches the transfer station D receives the foremost cap 31a which enters the bore 22 of the respective cylinder 27 and descends onto the upper side of the retainer 104 which is sufficiently close to the capping member to insure that the cap 31a (now assuming the position 31a′ of FIG. 2) extends into the bore of the respective chuck 25. Such descent of the cap 31a into the position 31a' may be caused by gravity and/or by the piston 33 which moves downwardly in the respective cylinder 27 as soon as the capping member 10 leaves the station D and advances toward the station E (arrow 10a) while the cap 31a slides along the retainer member 104. In the next step, and while the capping member advances toward the station E, the cam 38 permits the respective cylinder 27 to descend under the bias of its spring 47 and to axially compress the respective chuck 25 so that the chuck is deformed radially inwardly and engages the cap 31a' by friction whereby the cap begins to rotate because both capping members are constantly rotated by the respective pinions 15. The chuck 25 remains in deformed condition while the respective capping member moves toward, through and at least slightly beyond the station E.

At a point upstream of the station E, the cam 39 permits the sleeve 20 to descend in its guide A by gravity at the time the respective capping member 10 moves beyond the left-hand end of the retainer member 104, as viewed in FIG. 1, whereby the cap 31a' descends toward and its internal threads begin to mate with external threads of a top 50a on a bottle 50' which advances with the conveyor 52a at the same speed at which the capping members orbit in their circular path about the axis of the shaft 11. The descent of the sleeve 20 is gradual and is synchronized with the rotational speed of the respective capping member as well as with the pitch of threads on the bottle top 50a in such a way that the cap 31a' is screwed all the way down to seal the bottle 50a' without lifting the bottle and without causing axial movements of the cap 31a' in the respective chuck. When the cap 31a' is in sealing engagement with the bottle 50', the respective capping member travels from the station E back toward the station D, and the cam 38 thereupon causes the cylinder 27 to move upwardly against the bias of its spring 47 so that the chuck 25 is disengaged from the cap 31a' and may be lifted with the capping member when the follower 42 reaches a raised portion of the cam 39 which compels the sleeve 20 to lift the respective capping member away from the conveyer 52a. Shortly before the capping member returns to the station D, the cam 36 causes the plunger 33 to return to the position of FIG. 2 so that a new cap may enter the bore 22. This new cap is thereupon applied to the bottle 50".

As shown in FIG. 2, the capping machine comprises a supporting plate 52 which is adjacent to the discharge end of the chute 51 and which straightens out each foremost cap 31a at the time this cap is about to enter the bore 22. Of course, the machine also comprises a suitable blocking device which prevents discharge of caps from chute 51 during such intervals when neither of the two capping members 10 is at the station D. This blocking device is shown in FIG. 1 and comprises a two-armed lever 51a which is pivotally secured to the side wall of the chute 51 by means of a pin 51b. The left-hand arm of the lever 51a comprises a hook-shaped retaining portion or tip 51c which may engage the foremost cap 31 and then holds this cap against movement beyond the discharge end of the chute. The lever 51a may be rocked by a linkage 51d including a vertical link 51h which is articulately connected to the right-hand arm of a second two-armed lever 51e. The lever 51e is pivotable about a pin 51f which is secured to the support 37 and whose left-hand arm 51g extends into the path of the followers 42. The lower portion of the link 51h carries a nose 51i which may engage a cooperating nose 51j on the right-hand arm of the lever 51a so that the tip 51c releases the foremost cap 31b when the arm 51g is engaged by a roller 42 to pivot the lever 51a in a clockwise direction (arrow 51k). The pivot pin 51b is biased by a suitable torsion spring (not shown) so that the tip 51c normally tends to assume the retaining position of FIG. 1.

If desired, the nose 51j of the lever 51a may be replaced by a bifurcated portion which slidably receives the link 51h and which is tilted when engaged by the nose 51i.

An important advantage of the retainer member 104 is that, if desired, the supporting plate 52 may be dispensed with because each cap is forced to assume an optimum position for application to a bottle top at the time it is engaged by the responsive chuck 25, i.e., at a point beyond the range of the plate 52. In other words, if the caps are controlled only by the supporting plate 52, they may still become misaligned with the respective chucks while descending through the bores 22, whereas the retainer member 104 insures that the caps are properly centered at the time they are already accommodated in the bore of a chuck.

If the capping machine of FIGS. 1 and 2 comprises the aforementioned supporting plate 52, the retainer member 104 need not extend all the way to the transfer station D because, and as described in my aforementioned application Serial No. 111,776, this plate 52 normally extends from the station D and through a certain distance toward the station E in order to insure that the lowermost cap 31a is straightened out, i.e., that its axis is vertical, before it is engaged by the plunger 33 to move into the bore 22 and into the chuck 25. In such instances, the plate 52 terminates at a point upstream of the station E and the retainer member 104 begins where the plate 52 terminates. Thus, when the cap 31a advancing beyond the end of the plate 52 passes through the bore 22 and partly through the chuck 25, it comes to rest on the upper side of the retainer member 104 and is properly centered at the time the cylinder 27 descends to deform the chuck and to insure that the cap rotates with the chuck before the latter reaches the station E.

Furthermore, since the retainer member 104 automatically arrests each cap 31a' in optimum position for engagement with the respective chuck 25, the plunger 33 may be dispensed with because the caps may descend by gravity without it being necessary to force them into the chucks. In other words, the provision of plungers 33 is a precautionary measure to insure that the caps will descend onto the upper side of the retainer member 104 even if their dimensions vary within a wide range so that some caps are likely to become stuck in the bores 22 or in the bores of the respective chucks before the chucks are subjected to axial compression. Consequently, all that the capping machine of FIGS. 1 and 2 actually needs is a pair of sleeves 20 which reciprocate the respective capping members toward and away from the bottle tops, a pair of cylinders 27 which deform the respective chucks at the time the caps advance along the retainer member 104, means for rotating the chucks, means for feeding caps to the chucks, and means for advancing the chucks and the bottles in such a way that a portion of the circular path for the chucks overlaps a portion of the path along which the bottles advance with the conveyor 52a.

The retainer member 104 is secured to the floor by means of suitable rods or brackets 104a one of which is shown in FIG. 2. Of course, the retainer member need not extend all the way to or into close proximity of the station E as long as it supports each cap 31a' up to such time when the cap is properly engaged by and begins to rotate with the respective chuck 25. As a rule, the retainer member 104 is somewhat longer than necessary so that the caps 31a' continue to slide therealong after they begin to rotate with the respective chucks 25 to insure that they are properly centered in the capping members even if the chucks are undesirably deformed or worn away and could not center the caps without assistance by the retainer member.

Figure 3:
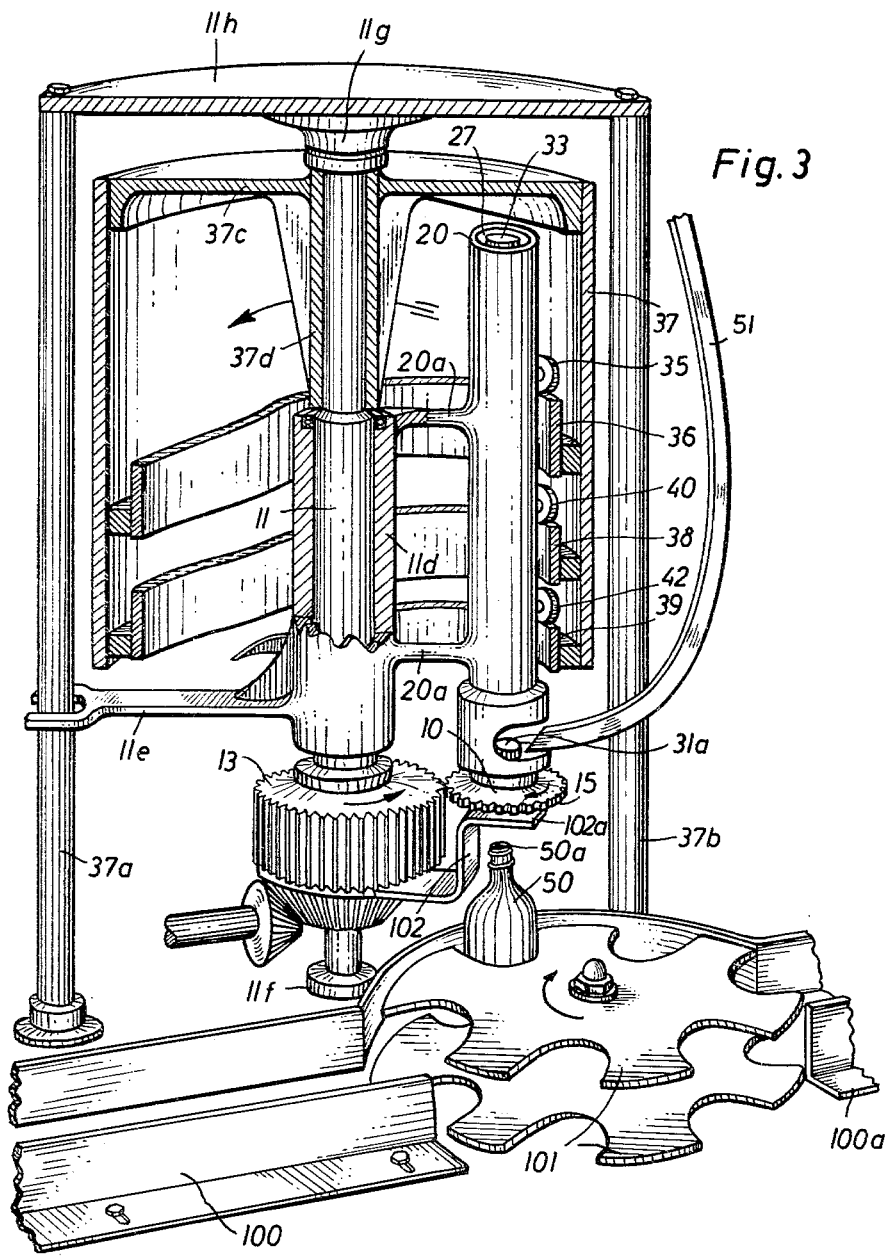
FIG. 3 is a perspective view of a modified capping machine which comprises a single capping member and a rotary retainer member.

The capping machine of FIG. 3 is very similar to the previously described capping machine with the exception that it comprises a single tubular capping member 10 which rotates about its own vertical axis but need not orbit about the shaft 11. The sleeve 20 comprises two vertically spaced arms 20a which are secured to a sleeve bearing 11d axially movably surrounding the shaft 11 and having a bifurcated extension 11e engaging the left-hand column 37a to prevent rotation of the bearing 11d.

The tubular support 37 for the cams 36, 38, 39 is connected to a disk 37c whose hub 37d is rotatable on the upper portion of the shaft 11. The lower end of this shaft is rotatable in a floor bearing 11f and its upper end rotates in a similar bearing 11g secured to a top plate 11h which is connected with the upper ends of the colums 37a, 37b.

The machine of FIG. 3 comprises a composite conveyer including two spaced straight conveyer section 100, 100a and a pair of rotary turnstiles 101 which are driven intermittently by a transmission (not shown) receiving motion from the shaft 11. Another transmission (not shown) rotates the tubular support 37 about the shaft 11.

In accordance with my invention, the machine of FIG. 3 comprises a modified retainer member 102 which is fixed to the shaft 11 and whose horizontal end portion 102a passes once beneath the capping member during each revolution of the driver gear 13. A cap 31a is permitted to descend into the chuck of the capping member at the time the end portion 102a of the retainer 102 assumes the position of FIG. 3 in which it is vertically aligned with the capping member so that the cap 31a comes to rest on the upper side of the end portion 102a just before the cylinder 27 descends in order to deform the chuck and to thereby insure that the chuck engages and rotates the cap 31a. The end portion 102a then moves away from the capping member and permits descent of the sleeve 20 (cam 39 and follower 42) at the time the turnstiles 101 advance a bottle 50 into alignment with the capping member. The bottle is then arrested so that the revolving chuck may apply the cap 31a to the top 50a, whereupon the revolving cam 39 lifts the sleeve 20 and the capping member 10 away from the top 50a immediately after the cylinder 27 releases the chuck so that the chuck may release the cap 31a and shares the movement of the sleeve 20. In the next step, the turnstiles 101 advance a new bottle into alignment with the sleeve 20 and the procedure is repeated as soon as the end portion 102a of the retainer member returns to the position of FIG. 3. The plunger 33 insures that the cap 31a is not stuck in the cylinder 27 or in the capping member on its way onto the horizontal upper side of the retainer portion 102a.

The machine of FIG. 3 applies one cap during each revolution of the driver gear 13, and the diameter of the pinion 15 is selected in such a way that the cap 31a completes a requisite member of revolutions and sealingly engages the bottle top 50a before the retainer member 102 completes a full revolution.

It will be readily understood that the conveyer 100, 101, 100a may be replaced by other types of conveyers with or without turnstiles as long as such conveyers can intermittently advance consecutive bottles beneath the capping member 10 in synchronism with rotary movements of the retainer member 102. The directions in which the cam support 37, the driver gear 13, the pinion 15 and the turnstiles 101 rotate are indicated by arrows. The U-shaped chute 51 contains a supply of internally threaded caps which advance by gravity feed.

Of course, it is not necessary to mount the retainer member 102 on the shaft 11 since it is equally possible to provide a separate drive for this retainer member which causes the latter to rotate or to reciprocate with respect to the capping member so that it passes beneath the lower end of the chuck whenever a new cap 31 is permitted to descend into the chuck. In other words, it is not absolutely necessary to utilize a revolving retainer member even though the solution of FIG. 3 offers many advantages because the capping machine need not be provided with separate rotating or reciprocating means for the retainer member.

The cam 36 permits the plunger 33 to descend by gravity at the time the end portion 102a is located below the stationary capping member, and the distance between the upper side of the end portion 102a and the capping member is selected in such a way that at least a portion of the cap 31a is accommodated in the bore of the chuck when this cap rests on the upper side of the end portion 102a. The cam 38 thereupon permits the cylinder 27 to descend and to bring about axial compression of the chuck before the end portion 102a moves away from the capping member so that the chuck engages and rotates the cap 31a prior to termination of supporting engagement between the retainer member and the cap. Consequently, the cap is properly centered at the time it is engaged by and begins to rotate with the constantly revolving chuck.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine for applying caps to bottles and similar containers, in combination, a capping member having a lower end; an annular chuck mounted in the lower end of said capping member and being movable between a gripping position in which it is adapted to grip a cap and a non-gripping position in which a cap is free to pass therethrough; means for moving said capping member and said chuck between a raised position and a lower position; feeding means for delivering caps at spaced intervals from above and into said chuck whereby a cap may pass through said chuck in said non-gripping position of the chuck; a retainer member having a portion located below said chuck when said capping member is in said raised position so as to properly locate in said chuck a cap which is delivered by said feeding means; means for moving said chuck from said non-gripping position to said gripping position after a cap has been delivered into said chuck and is properly located by said retainer member; and means for moving one of said members into vertical alignment with the other member before a cap has been delivered into said chuck, and for moving said one member out of vertical alignment with said other member after the chuck has gripped a properly located cap.

2. A structure as set forth in claim 1, wherein said one member is movable in a substantially horizontal plane.

3. A structure as set forth in claim 2, wherein said one member is said retainer member and wherein said retainer member is rotatable in said horizontal plane to move into vertical alignment with said capping member immediately below said chuck during a portion of each revolution thereof whereby a cap which is received in said chuck may come to rest on said retainer member, said retainer member being out of vertical alignment with said capping member during the remainder of each revolution thereof following movement of the chuck to said gripping position whereby the capping member may lower the chuck with a cap gripped therein in order to apply the cap to the top of a container located below said chuck.

4. A structure as set forth in claim 1, wherein the means for moving the capping member and the chuck between said raised position and said lower position comprises a supporting sleeve connected to and extending upwardly from said capping member, and annular cam means operatively connected with said supporting sleeve.

5. A structure as set forth in claim 1 for applying threaded caps to threaded tops of bottles and similar containers, further comprising means for rotating said capping member and said chuck so that a properly located cap which is gripped by said chuck may be screwed on the top of a container during movement of said capping member from said raised position to said lower position.

6. A structure as set forth in claim 5, wherein said chuck consists of elastically deformable material and is tightly fitted in the lower end of said capping member, said means for moving the chuck from said non-gripping position to said gripping position comprising means for axially compressing the chuck whereby the chuck is deformed radially inwardly and grips a cap which is located on said retainer member.

7. A structure as set forth in claim 5, wherein the means for rotating said capping member comprises a driver gear, a pinion mating with said driver gear and coaxially surrounding said capping member, and overload coupling means drivingly connecting said pinion with said capping member.

8. A structure as set forth in claim 5, further comprising a conveyor arranged to support and to advance a series of containers beneath said chuck so that a fresh container registers with said chuck whenever said capping member is moved to the lower position thereof whereby a cap which is gripped by said chuck may be applied to the top of a container.

9. A structure as set forth in claim 5, wherein the means for rotating said capping member comprises a vertical shaft adjacent to the capping member, a driver gear coaxially mounted on said shaft, a pinion coaxially connected with said capping member and mating with said gear, and means for driving said shaft.

10. A structure as set forth in claim 1, wherein said one member is said capping member and wherein said capping member is rotatable in a circular path about a vertical axis which is spaced from the axis of said capping member, said retainer member being stationary and extending along a portion of said circular path whereby a cap which is received in said chuck may come to rest on said retainer member while the capping member rotates in said portion of its circular path.

11. A structure as set forth in claim 10, wherein said retainer member is a flat strip of arcuate shape having an upper side disposed in a horizontal plane.

12. In a machine for applying caps to bottles and similar containers, in combination, a plurality of tubular capping members each having a vertical axis of rotation and a lower end; drive means for rotating said capping members in a circular path about a second vertical axis which is equidistant from said first mentioned axes; an annular chuck mounted in the lower end of each capping member, each of said chucks being movable between a gripping position in which it is adapted to grip a cap and a non-gripping position in which a cap is free to pass therethrough; means for moving said capping members and the respective chucks consecutively between a raised position and a lower position; feeding means for delivering caps at spaced intervals from above and into the chucks of consecutive capping members whereby the caps may pass through the respective chucks in said non-gripping positions of the chucks; a retainer member located below that portion of said circular path in which the chucks and the corresponding capping members rotate in raised positions thereof so that said retainer member locates the caps properly in consecutive chucks while the corresponding capping members rotate in said portion of said circular path; and means for moving the chucks of consecutive capping members from said non-gripping positions to said gripping positions thereof after a cap has been delivered into the corresponding chuck and is properly located by said retainer member.

13. A structure as set forth in claim 12 for applying internally threaded caps to externally threaded tops of bottles and similar containers, further comprising means operatively connected with said drive means for rotating said capping members about their respective axes so that said chucks rotate with the corresponding capping members and may transmit rotation to the caps which are gripped thereby.

14. A structure as set forth in claim 13, further comprising a conveyor for advancing the containers in a path which is overlapped by said circular path.

15. A structure as set forth in claim 13, wherein said feeding means comprises a chute for delivering caps by gravity feed at a point of said circular path which is located ahead of said retainer member as seen in the direction in which said capping members rotate.

References Cited by the Examiner
UNITED STATES PATENTS 1,379,106    5/21    Konefes _____ 53—302

FRANK E. BAILEY, *Primary Examiner.*
ROBERT E. PULFREY, *Examiner.*